UNITED STATES PATENT OFFICE 2,572,020

DIALKYL-DELTA-ACYLAMINOBUTYL-MALONATE AND PROCESS FOR PREPARING SAME

Don E. Floyd, Robbinsdale, Minn., assignor to General Mills, Inc., a corporation of Delaware No Drawing. Application March 3, 1949, Serial No. 79,519

6 Claims. (Cl. 260—471)

The present invention relates to novel dialkyl-delta-acylamino butylmalonate and process for preparing same and to the use of these compounds in the synthesis of lysine.

Many compounds have been prepared in the past as intermediates for the synthesis of lysine. They have suffered from numerous disadvantages such as difficulty in preparation, high cost of raw materials, high cost of processing, difficulty in purification, instability of product, low yields, and difficulty in conversion to lysine. The intermediate amino compounds disclosed herein are valuable organic compounds useful for preparing amino acids, especially lysine. These compounds can be prepared in good yields by processes which can be carried out without difficulty and starting with materials which are commercially available. The products can be isolated readily and purified by relatively simple means, in most instances by crystallization.

The novel compounds of the present invention have the following formula:

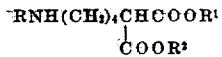

in which R is an acyl group, and $R^1$ and $R^2$ are low alkyl groups of one to four carbon atoms and may be alike or different.

These compounds may be prepared by either of two methods, starting with epsilon-acylamido caproate esters. The following reactions illustrate the preparation of these compounds from ethyl epsilon-benzamido caproate:

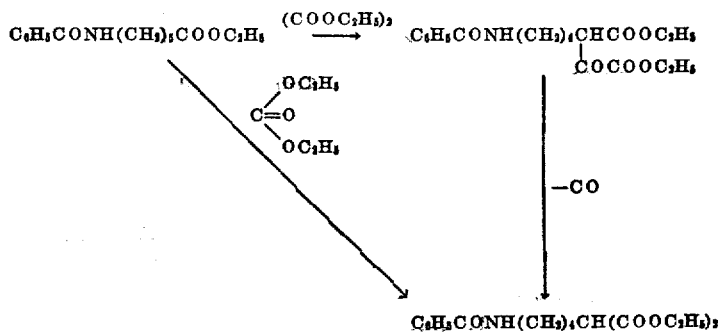

The following examples will serve to illustrate the invention:

Example 1

11.5 g. of sodium metal was dissolved in 200 ml. of absolute ethanol while nitrogen gas was bubbled through the solution. The sodium ethoxide solution was concentrated in vacuo at 50–60° C. to a porous solid residue. To this residue was added 73 g. of ethyl oxalate. A clear, pale yellow solution was obtained. To it was added 131.5 g. of ethyl epsilon-benzamido caproate. The viscous, yellow solution was heated at 50–60° C. while a vacuum of 100±5 mm. was applied to the system. The ethanol produced was distilled off and collected in a cooled receiver. After about two hours no more ethanol was obtained. The reaction product was dissolved in about 250 ml. of water at about 50° C. The aqueous solution was made barely acid to litmus with 6 N sulfuric acid. The ethyl - alpha - ethoxalyl - epsilon - benzamido caproate that separated out as an oil was isolated by ether extraction. It weighed 151 g. A 2,4-dinitrophenylhydrazone derivative was prepared in the usual manner. It melted at 112–3° C. Analysis for nitrogen gave the following results: Calcd. for N, 12.8. Found: N, 12.63.

One hundred seventeen and six-tenths grams of ethyl alpha-ethoxalyl-epsilon-benzamido caproate was decarbonylated by heating at about 150° C. under a partial vacuum. Carbon monoxide was liberated for about one and one-half hours. The residual liquid was distilled and there was collected 98.1 g. of a nearly colorless distillate which boiled at 189–192° C./0.2 mm. It consisted of diethyl delta-benzamidobutylmalonate.

A diamide derivative was prepared by saturation of an alcoholic solution of this ester with ammonia gas at 50–60° C. The diamide melted at 217–8° C. Anal. Calcd. for $C_{14}H_{19}N_3O_3$: C, 60.65; H, 6.8; N, 15.6. Found: C, 60.52; H, 6.66; N, 15.17.

Example 2

The same condensation reaction was also conducted in the following manner. Two and three-tenths grams of sodium was converted to a solid residue of sodium ethoxide as in the previous example. To the solid was added 16.1 g. of ethyl oxalate and a solution of 26.3 g. of ethyl epsilon-benzamido caproate in 50 ml. of dry ether. The resulting solution was allowed to stand at room temperature in a stoppered flask for two days. Then the yellow solution was extracted with 150 ml. of cold water. The aqueous layer was separated and then made barely acid to litmus with 6 N sulfuric acid. The ethyl alpha-ethoxalyl-epsilon-benzamido caproate separated out as an oil and was isolated by ether extraction. It weighed 19.9 g. This product gave the same 2,4-dinitrophenyl-hydrazone as the preceding one.

Example 3

Diethyl delta-benzamidobutylmalonate was also prepared by another method. One and two-tenths grams of sodium was dissolved in 20 ml. of absolute ethanol and to the solution was added 59 g. of ethyl carbonate and 13.1 g. of ethyl epsilon-benzamido caproate. The mixture was heated and ethanol fractionated off at atmospheric pressure over a period of three hours. The mixture was cooled and treated with 4 ml. of glacial acetic acid and then washed. The excess ethyl carbonate and ethyl epsilon-benzamido caproate were distilled off to leave a high boiling liquid residue (169–184° C./0.1 mm.), which was diethyl delta-benzamidobutylmalonate. Treatment of a portion of this liquid with ammonia gas in alcohol gave a solid diamide which was identical with the diamide described in Example 1.

Example 4

Ethyl alpha-ethoxalyl-epsilon-formamido caproate was prepared in the following manner. A solid residue of sodium ethoxide was prepared from 4.6 g. (0.2 mole) of metallic sodium as in Example 1. To this residue was added 58.4 g. (0.4 mole) of ethyl oxalate and 37.4 g. (0.2 mole) of ethyl epsilon-formamido caproate. The reaction was conducted in a manner similar to that described in Example 1. After about 1½ hours no more by-product ethanol was obtained. Then the reaction mixture was cooled and shaken with a solution of 15 ml. acetic acid in 100 ml. of water. The organic layer was isolated by ether extraction, washed with water and dried over sodium sulfate. The ether was removed by distillation and the excess ethyl oxalate distilled off under reduced pressure. There was left 51 g. of a viscous, straw-colored liquid as condensation product (ethyl alpha - ethoxalyl - epsilon - formamido caproate). The 2,4-dinitrophenylhydrazone of this compound was prepared. It melted at 78–9° C. Analysis for nitrogen gave the following results: Calcd. for N, 14.9. Found: N, 14.72.

Forty-five grams of ethyl alpha-ethoxalyl-epsilon-formamido caproate was decarbonylated by heating at about 160–70° C. under a partial vacuum for one hour to eliminate carbon monoxide. Upon distillation of the remaining liquid in an alembic still, there was obtained 36.4 g. of a colorless distillate which boiled at 139–140° C./0.2 mm. It consisted of diethyl delta-formamidobutyl-malonate.

Example 5

Ethyl alpha-ethoxalyl-epsilon-acetamido caproate was prepared in the following manner. To a solid residue of sodium ethoxide prepared from 9.2 g. (0.4 mole) of sodium was added a solution of 64 g. (0.4 mole+10%) of ethyl oxalate and 80.4 g. (0.4 mole) of ethyl epsilon-acetamido caproate in 150 ml. of dry ether. A pale yellow homogeneous solution was obtained after shaking. The reaction mixture was allowed to stand at room temperature in a closed flask for three days. Then it was extracted with two 150 ml. portions of ice water. The yellow-colored aqueous solutions were acidified to litmus with dilute sulfuric acid and an oily layer separated out at once. Complete separation of this product was effected by saturation of the solution with sodium chloride and extraction with ether. There was obtained 101.2 g. of ethyl alpha-ethoxalyl-epsilon-acetamido caproate as an orange-colored, viscous liquid.

Fifty-eight grams of the ethyl alpha-ethoxalyl-epsilon-acetamido caproate was decarbonylated by heating at about 170° C. under partial vacuum for one hour. After removal of the evolved carbon monoxide, the residual liquid was distilled under reduced pressure using an alembic still. It boiled in the range of 140–145° C./0.15–0.2 mm. and consisted of diethyl delta-acetamidobutyl-malonate. The distillate weighed 30.4 g.

The preparation of lysine from the compounds of the present invention is illustrated by the following reactions showing the use of diethyl delta-benzamidobutylmalonate as the starting material:

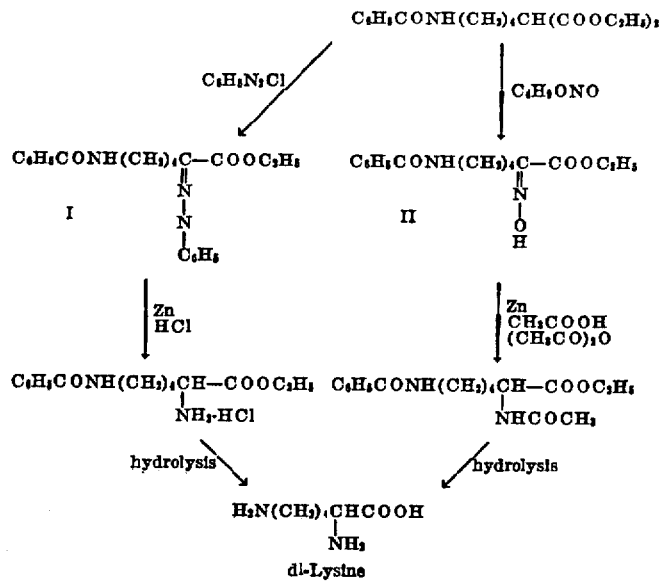

The following examples will illustrate the preparation of lysine according to these reactions:

Example 6

Ethyl alpha-oximino-epsilon-benzamidocaproate was prepared in the following manner. Four and six-tenths grams of sodium was dissolved in 100 ml. of absolute ethanol and 67 g. of diethyl delta-benzamidobutylmalonate was added. The solution obtained was cooled in a bath of ice and water and the temperature maintained at 5–10° C. while 23 g. of n-butyl nitrite was added slowly and with stirring. The mixture was stirred for one-half hour more and then concentrated at 30–35° C. in vacuo to a syrup. The syrup was dissolved in 200 ml. of cold water and the solution washed with ether. It was then made barely acid to litmus with concentrated hydrochloric acid. The oil that separated out was taken up in ether. Crystals weighing 28.7 g. and melting at 130–2° C. soon separated from the ether. A second crop of crystals weighing 23.4 g. and melting at 128–131° C. was obtained by concentration of the mother liquor. Recrystallization from 70% ethanol raised the melting point to 133–4° C. The two crops were identical. Anal. Calcd. for $C_{15}H_{20}N_2O_4$: C, 61.6; H, 6.85; N, 9.6. Found: C, 61.30; H, 6.69; N, 9.33.

Ethyl alpha-oximino-epsilon-benzamidocaproate was reduced to give ethyl alpha-acetamido-epsilon-benzamidocaproate as follows: Ten grams of the oximino ester was dissolved in a mixture of 20 ml. of glacial acetic acid and 20 ml. of acetic anhydride. The solution was stirred vigorously and 6.7 g. of zinc dust was added in small portions so that the heat of reaction maintained the temperature at 50–55° C. The reaction mixture was stirred for two additional hours and then filtered. The filter cake was washed with a few ml. of acetic acid and the filtrate and washing were combined and concentrated under reduced pressure on the steam bath. There remained 8.1 g. of the ethyl alpha-acetamido-epsilon-benzamidocaproate, isolated as a viscous liquid which did not readily crystallize. It was hydrolyzed to give dl-lysine in the following manner.

Seven grams of reduction product was heated under reflux with a solution of 60 ml. of concentrated hydrochloric acid and 40 ml. of water for eight hours. The benzoic acid that crystallized out was removed by filtration and the filtrate was concentrated to a viscous syrup under reduced pressure. Dl-lysine dihydrochloride was isolated from the syrup by precipitation with ether. It weighed 2.5 g. Recrystallization from ether-alcohol gave a product melting at 180–3° C. It proved to be identical with an authentic sample of dl-lysine dihydrochloride. The N,N-dibenzoyl derivative was prepared (M. P. 144–5° C.) and shown to be identical with dl-N,N-dibenzoyl lysine. Anal. Calcd. for $C_{20}H_{22}N_2O_4$: C, 67.8; H, 6.2; N, 7.9. Found: C, 67.7; H, 6.32; N, 8.04.

Example 7

A pasty mass was prepared from 3 g. of aniline and 15 ml. of concentrated hydrochloric acid. The mass was cooled to 0° C. and a solution of 2.7 g. of sodium nitrite in 20 ml. of ice water was slowly added, with stirring. A clear solution was obtained. A second solution was prepared by dissolving 11.2 g. of diethyl delta-benzamidobutylmalonate in 35 ml. of absolute ethanol, cooling the resulting solution to 0° C. and adding 13 ml. of 50% potassium hydroxide solution, followed by 75 ml. of ice-water. To this new solution, which was kept at or near 0° C., was added the previously described diazonium salt solution, with stirring, over a period of about two minutes. There was a vigorous evolution of gas which rapidly subsided. The mixture was stirred for five minutes and then the red oil that had separated was taken up in ether, and the solution was washed with 5% aqueous alkali and dried. Evaporation of the ether left 7.1 g. of the phenylhydrazone of ethyl alpha-keto-epsilon-benzamidocaproate as a viscous red-colored liquid.

The phenylhydrazone of ethyl alpha-keto-epsilon-benzamidocaproate was reduced as follows: Five grams of this phenylhydrazone was dissolved in 20 ml. of absolute ethanol and 4 g. of zinc dust was added to the solution. The mixture was maintained at 10–15° C. and was stirred while 500 ml. of 10% alcoholic hydrochloric acid was added over a period of two hours. Stirring was continued for three hours at this temperature. The solid was filtered off and the colorless filtrate was concentrated under reduced pressure to a thick syrup. This syrup was acetylated by treatment with dilute sodium hydroxide and acetic anhydride. There was isolated 2.7 g. of ethyl alpha-acetamido-epsilon-benzamido-caproate as a viscous liquid which did not readily crystallize. It was hydrolyzed by the method described in Example 6 and there was obtained 0.8 g. of dl-lysine dihydrochloride, identical with that prepared by the previously described method.

It is apparent from the above description that numerous variations are possible in the compounds without departing from the spirit of the invention. Thus the typical acyl groups, formyl, acetyl, and benzoyl, have been shown for these compounds. Inasmuch as the acyl group is hydrolyzed off in the preparation of lysine, it is apparent that any acyl group would be satisfactory for blocking this amino group. Similarly, diacyl groups such as phthalyl, may be used for blocking this amino group, and it is to be understood that the term N-acyl is intended to include such diacyl groups. Likewise, while the ethyl group has been shown in the examples as the alcoholic group of the ester, it is apparent that other low alkyl alcoholic groups such as methyl, propyl, and butyl, may be used. The ethyl group is used for illustration, since it is the preferred group, inasmuch as both ethyl oxalate and ethyl carbonate are readily available materials. It will be apparent that other low alkyl esters may be used, but these are less readily available.

I claim as my invention:

1. Compounds having the following formula:

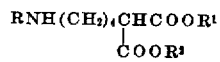

in which R is an acyl group, and $R^1$ and $R^2$ are lower alkyl groups containing from one to four carbon atoms.

2. A compound having the following formula:

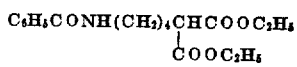

3. A compound having the following formula:

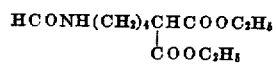

4. A compound having the following formula:

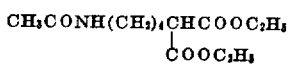

5. Process of preparing compounds having the following formula:

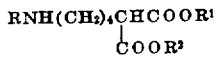

in which R is an acyl group, and R$^1$ and R$^2$ are lower alkyl groups containing from one to four carbon atoms, which comprises reacting a lower alkyl ester of epsilon-acylamido caproic acid with a lower alkyl oxalate to produce the corresponding oxalyl derivative, and thereafter decarbonylating said oxalyl derivative to produce the first mentioned compound.

6. Process of preparing compounds having the following formula:

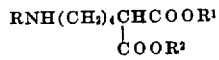

in which R is an acyl group, and R$^1$ and R$^2$ are lower alkyl groups containing from one to four carbon atoms, which comprises reacting a lower alkyl ester of epsilon-acylamido caproic acid with a lower alkyl carbonate to produce the first mentioned compound.

DON E. FLOYD.

REFERENCES CITED

The following references are of record in the file of this patent:

UNITED STATES PATENTS

| Number | Name | Date |
|---|---|---|
| 1,524,962 | Altwege et al. | Feb. 3, 1925 |
| 2,445,817 | Archer et al. | July 27, 1948 |

OTHER REFERENCES

Lux: Berichte, vol. 62B, pp. 1824–1827 (1929).

Redemann et al.: J. Biol. Chem., vol. 130, pp. 341–348 (1939).

Albertson et al.: J. Am. Chem. Soc., vol. 67, pp. 308–310 (1945).

Albertson: J. Am. Chem. Soc., vol. 68, pp. 450–453 (1947).

Galat: J. Am. Chem. Soc., vol. 69, p. 965 (1947).

Floyd et al.: J. Am. Chem. Soc., vol. 69, pp. 2354–2355 (1947).

Certificate of Correction

Patent No. 2,572,020                                October 23, 1951

DON E. FLOYD

It is hereby certified that error appears in the printed specification of the above numbered patent requiring correction as follows:

Column 2, line 33, for "N, 15.6" read $N, 15.16$;

and that the said Letters Patent should be read as corrected above, so that the same may conform to the record of the case in the Patent Office.

Signed and sealed this 19th day of February, A. D. 1952.

[SEAL]

THOMAS F. MURPHY,
*Assistant Commissioner of Patents.*